United States Patent
Ota et al.

(10) Patent No.: US 6,710,483 B2
(45) Date of Patent: Mar. 23, 2004

(54) ACTUATOR CAPABLE OF REVOLVING

(75) Inventors: Tomohiro Ota, Osaka (JP); Katsuhiro Hirata, Sanda (JP); Hitoshi Kitano, Takarazuka (JP); Yoshikazu Shikata, Osaka (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/910,486

(22) Filed: Jul. 20, 2001

(65) Prior Publication Data

US 2002/0081220 A1 Jun. 27, 2002

(30) Foreign Application Priority Data

Dec. 27, 2000 (JP) ........................ 2000-398624

(51) Int. Cl.[7] ............... H02K 41/06; H02K 3/04; R04C 18/02
(52) U.S. Cl. ............ 310/82; 310/156.32; 310/154.05; 417/410.5; 418/55.1
(58) Field of Search ............. 310/156.32, 154.05, 310/82, 81, DIG. 6, 159, 179, 184, 20, 80; 417/410.5; 418/55.1, 55.3–55.5

(56) References Cited

U.S. PATENT DOCUMENTS

| 3,223,870 A | * | 12/1965 | Boudot | .................. 310/268 |
| 5,791,883 A | * | 8/1998 | Ban et al. | .............. 417/410.5 |
| 2002/0081220 A1 | * | 6/2002 | Ota et al. | .............. 417/410.5 |

FOREIGN PATENT DOCUMENTS

| JP | 03-000991 | * | 1/1991 | ............ F04C/18/02 |
| JP | 59-93443 | * | 6/1996 | ............ H02K/3/44 |
| JP | 08-205515 | | 8/1996 | |
| JP | 11-275851 | | 10/1999 | |
| JP | 2000045967 | * | 2/2000 | ............ H02K/7/14 |
| JP | 2001169530 | * | 6/2001 | .......... H02K/41/06 |
| JP | 2002078316 | * | 3/2002 | .......... H02K/41/06 |
| JP | 2002-199695 | * | 7/2002 | ........ H02K/41/035 |

* cited by examiner

*Primary Examiner*—Karl Tamai
(74) *Attorney, Agent, or Firm*—Seed IP Law Group PLLC

(57) ABSTRACT

A revolution type actuator having a movable member performing a revolution motion includes a movable member capable of revolving with respect to a fixed member, a plurality of conducting paths which are provided on a face parallel to a trajectory face of the above-mentioned revolution motion and through which currents flow in mutually intersecting directions, power supply which flows currents having different phases through the above-mentioned plurality of conducting paths, and a magnetic field generator which forms a magnetic field perpendicular to the above-mentioned conducting path, in which the above-mentioned movable member revolves due to an electromagnetic force generated by an interaction between a current flowing through said conducting path and a magnetic field generated by the above-mentioned magnetic field generator. By this configuration, it is possible to obtain a revolution motion directly as an output without using an output transforming mechanism and also accommodate a high-speed rotation because in principle there is no variation in the magnetic gap between the movable element and the fixed element.

20 Claims, 16 Drawing Sheets

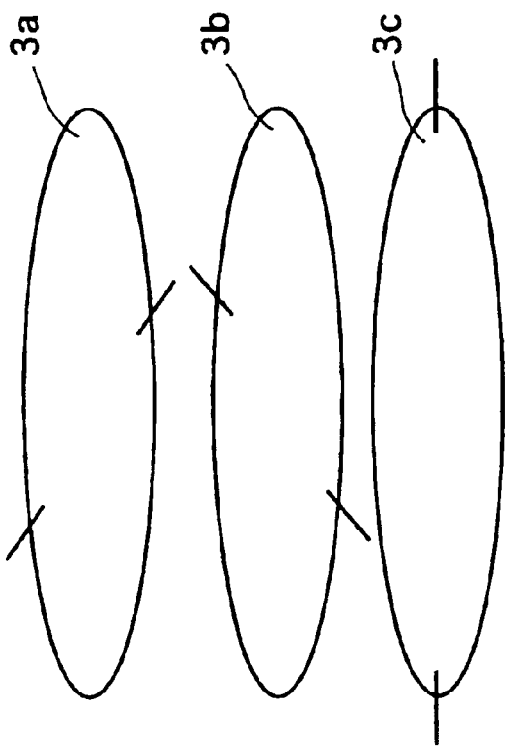
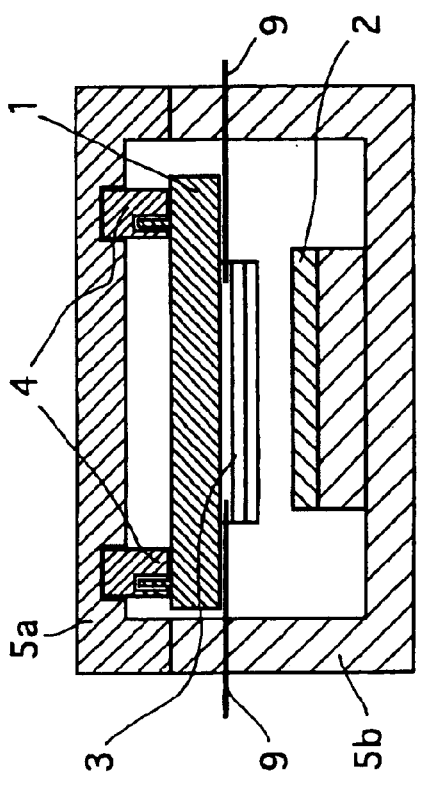
FIG.18(a)
FIG.18(b)

ACTUATOR CAPABLE OF REVOLVING

BACKGROUND OF THE INVENTION

1. Field of the Invention

The present invention relates to a revolution type actuator that can use its output as a source for driving industrial machines, civil-use machines, and the like which apply a revolution motion.

2. Description of the Related Art

Conventionally, there has been employed such a method as obtaining a revolution motion as an output by using an output transforming mechanism to thereby transform a rotation motion of a stepping motor, a DC (Direct Current) motor, or the like into a revolution motion. On the other hand, however, there has been known such a variable-gap type motor, a variable-reluctance type motor, or the like which revolve their movable element directly, as disclosed in each gazette of the Japanese Unexamined Patent Application Nos. HEI 8-205515 and HEI 11-275851. Those motors utilize an electromagnetic force generated in the same direction as the main magnetic flux, thus featuring a low-speed high-torque rotation.

However, the above-mentioned method for transforming an rotation motion of a stepping motor, a DC motor and the like to a revolution motion by using an output transforming mechanism has suffered from such problems that friction generated at the output transforming mechanism portion deteriorates the efficiency and the apparatus using such a method is difficult to miniaturize. A variable-gap type motor or a variable-reluctance type motor, on the other hand, has a larger gap length than the conventional type DC motor and the like to thus have stronger leakage magnetic flux and a larger gap variation, suffering from a problem of difficulty of high-speed rotation.

BRIEF SUMMARY OF THE INVENTION

In view of the above, it is an object of the invention to provide a revolution type actuator that can directly obtain a revolution motion without using the above-mentioned output transforming mechanism to thereby utilize that output as a source for driving industrial machines, civil-use machines and the like which apply a revolution motion and also that can accommodate a high-speed rotation based on its principle of having no variation in the magnetic gap between its own movable element and fixed element.

To this end, a revolving type actuator having a revolving movable element revolving according to the invention comprises a movable member capable of revolving with respect to a fixed member, a plurality of conducting paths arranged in a plane parallel to a trajectory face of the revolution motion for flowing currents therein a plurality of currents in mutually intersecting directions, a power supply which flows currents having mutually different phases in the plurality of conducting paths, and a magnetic field generator which forms a magnetic field in a direction perpendicular to the conducting paths, in which the movable member revolves by an electromagnetic force generated by an interaction between a current flowing in the conducting path and a magnetic field given by the magnetic field generator. The above-mentioned magnetic field generator may be comprised of a magnet and a stator magnetized by magnetic flux generated by this magnet in such a configuration that the above-mentioned movable member is disposed opposite to the magnetic pole of the magnetic in a plane perpendicular to the magnetic flux interposed between the magnet and the stator and have a conductor attached thereto for forming the conducting path.

The revolution type actuator according to the invention in which the movable member constrained from rotating by a rotation constraining mechanism is revolved with a predetermined revolution radius for driving machines features that at least one conducting path is formed which flows a current on the above-mentioned revolution trajectory face or in a plane parallel to this revolution trajectory face to thereby form a magnetic field perpendicular to the above-mentioned conducting path so that an electromagnetic force generated by an interaction between the above-mentioned current and the electromagnetic force generated by the above-mentioned magnetic field may change the magnitude of the above-mentioned current for thus producing an eccentric revolution motion around a predetermined eccentric shaft, accordingly the revolution axis and the magnetic flux involved in the generation of the electromagnetic force are parallel with each other to thereby eliminate a variation in the gap between the movable member and the stator in principle and so enable designing the gap length sufficiently small within the most advantageous range practically, thus obtaining an excellent effect of being able to accommodate a high-speed rotation, which has been impossible with a prior art revolution type actuator.

BRIEF DESCRIPTION OF THE SEVERAL VIEWS OF THE DRAWINGS

The above and other objects, advantages, and features of the invention will be more apparent from the following description taken in conjunction with the accompanying drawings, in which:

FIGS. 18(a) and 18(b) are illustrations for showing configuration examples of a revolution type actuator and a conducting path according to a twelfth embodiment of the invention.

DETAILED DESCRIPTION OF THE INVENTION

Embodiments of the present invention will now be explained with reference to the drawings.

Figure 1:
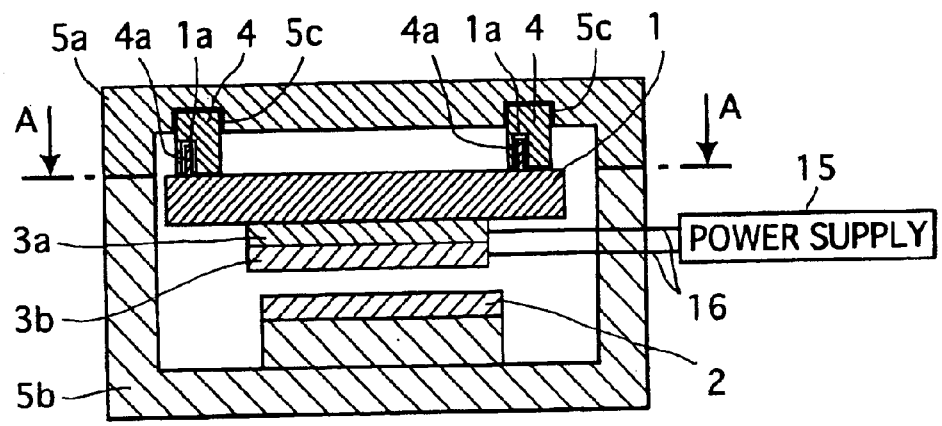
FIG. 1 is a cross-sectional view for showing a revolution type actuator according to a first embodiment of the invention.

FIG. 1 shows a revolution type actuator according to a first embodiment of the invention. In FIG. 1, the revolution type actuator comprises a movable member 1 capable of parallel movement (revolution motion) with a predetermined revolution radius, a permanent magnet 2 for generating an axial magnetic field, conducting paths 3a and 3b for generating an electromagnetic force on the above-mentioned movable member 1, an eccentric shaft 4 for preventing of the above-mentioned movable member 1 from rotating and for revolving it with the predetermined radius, and stators (iron core) 5a and 5b entirely surrounded by a magnetic substance so as to prevent magnetic flux occurring from the above-mentioned permanent magnet 2 from leaking outside. The stators 5a and 5b serve also as an outer case. Although how to utilize the revolution motion of the movable member 1 is not specifically illustrated in this paper, appropriately it may be utilized in a scroll pump for compressing a fluid as described in the following embodiment. Besides, the revolution motion may be output as is to the outside.

As for a mechanism for restricting the motion of the movable member 1 to a revolution trajectory and also constraining its rotation, at least two pins 1a provided as elevated to the movable member 1 are fitted in a rotary manner to an eccentric hole 4a in the eccentric shaft 4, which is in turn held in a rotary manner by a bearing (not shown) at a hole 5c provided in the stator 5a serving as a fixing member. The conducting paths 3a and 3b are on a face parallel to the trajectory face of the revolution motion on which currents from an external power supply 15 flow via a lead wire 16 through these paths 3a and 3b in intersecting directions with a phase difference of 90° to each other. The permanent magnet 2 and the stators 5a and 5b form in combination a magnetic field perpendicular to the conducting paths 3a and 3b (magnetic field generator). In this embodiment, the conducting paths 3a and 3b (conductors) are attached to the movable member 1, which revolves with an electromagnetic force generated by an interaction between the currents flowing through the conducting paths 3a and 3b and the magnetic field produced by the permanent magnet 2.

Figure 2:
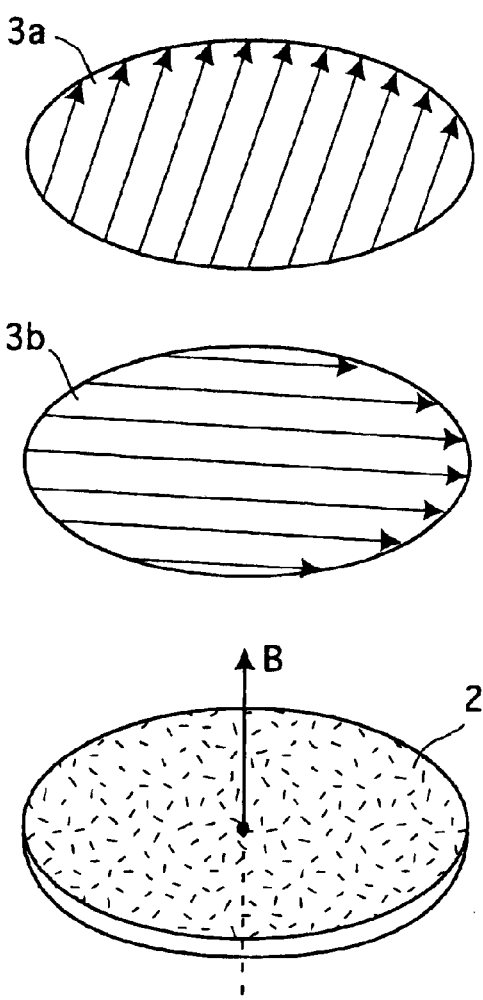
FIG. 2 is perspective views for showing configuration examples of conducting paths and a magnetic field generator in the actuator of FIG. 1.

FIG. 2 shows configuration example of the conducting paths 3a and 3b and the permanent magnet 2 for producing a magnetic field in various directions (indicated by an arrow B in the figure) in the revolution type actuator of this embodiment. The conducting paths 3a and 3b are given on respective paired circuit board in such a configuration that they flow currents in a direction different from each other (indicated by arrows) of printed wiring lines (intersecting each other) at an angle of 90°. The movable member 1 can revolve at a predetermined revolution radius, with using the two eccentric axes 4, thus being constrained from rotating. The permanent magnet 2 is magnetized so as to generate a magnetic field in the direction of the revolution axis, thus generating a predetermined vertical magnetic field on the conducting path 3a and 3b.

Figure 3:
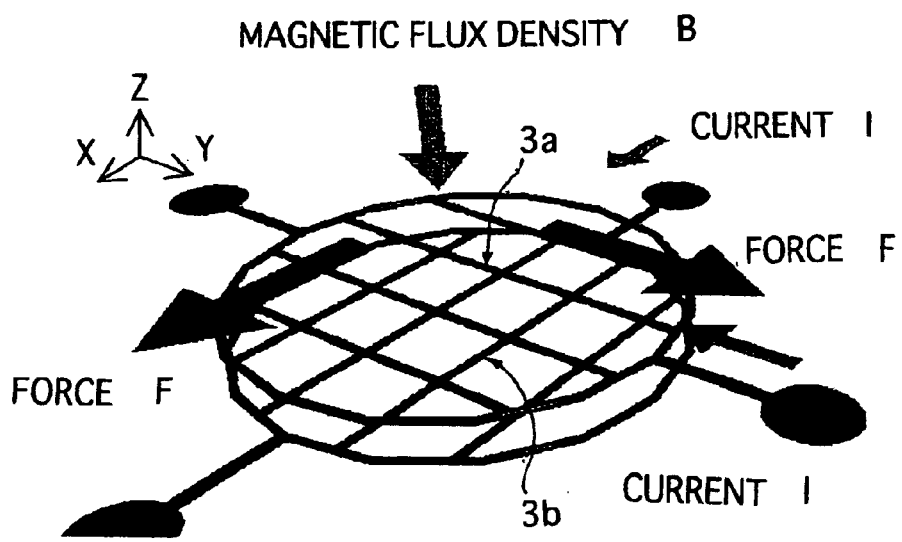
FIG. 3 is an illustration for showing an operating principle of the actuator of FIG. 1.

When the above-mentioned conducting paths 3a and 3b are supplied with AC (Alternating Current) currents from the power supply 15, a current flows perpendicular to the axial magnetic field generated by the permanent magnet 2. Accordingly, as shown in FIG. 3, on the conducting paths 3a and 3b, an electromagnetic force F occurs (by the Fleming's left-hand rule) in a direction perpendicular to both a current I and a magnetic field (magnetic flux density) B. The AC currents supplied to the conducting paths 3a and 3b are given a phase difference of 90° therebetween, thus providing a circle in motion of the direction of a sum of forces generated at the conducting paths 3a and 3b respectively. This effectively gives a force to the movable member 1 in its predetermined revolution direction so that it can revolve with the predetermined radius. As a result, a load can be reduced which acts on the trajectory constraining mechanism. Also, no axial force occurs, thus extremely decreasing vibrations and the like.

Figure 4:
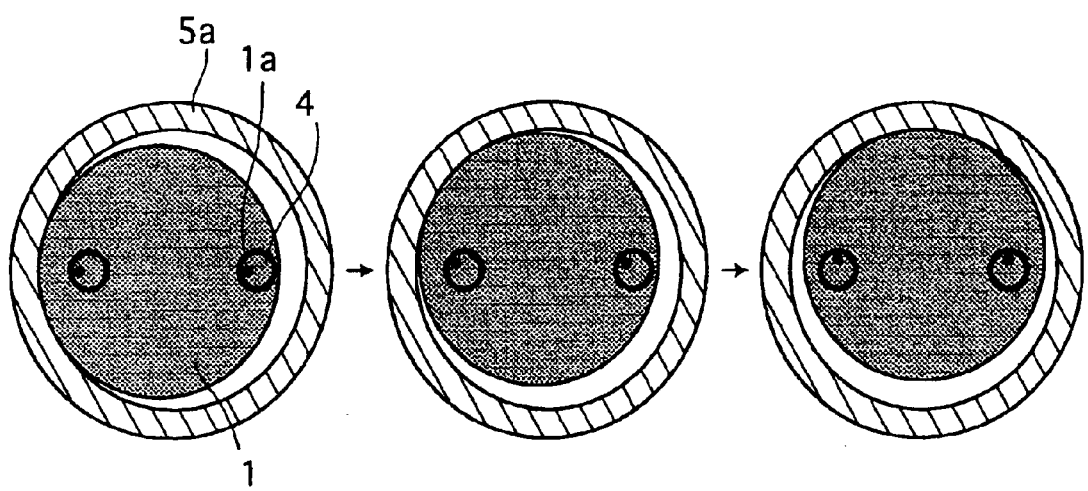
FIG. 4 is a cross-sectional view for showing operations of a movable member of the actuator of FIG. 1.
Figure 5:
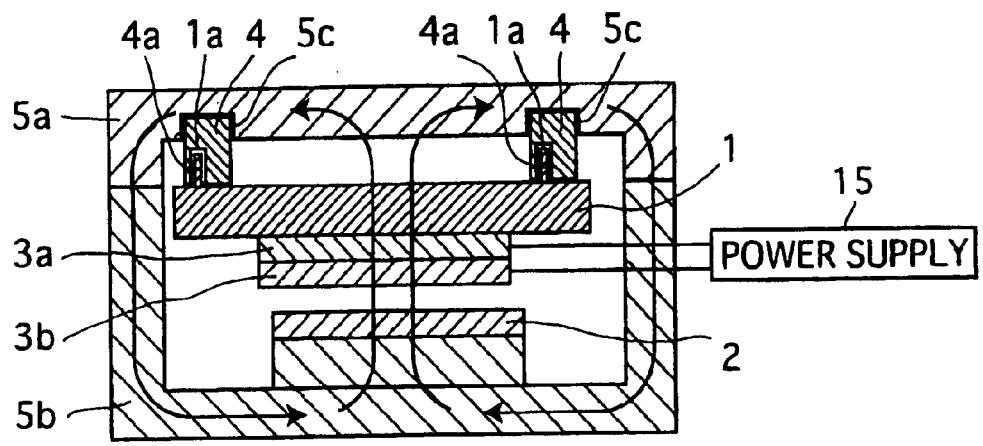
FIG. 5 is an illustration for showing a path of magnetic flux in the actuator of FIG. 1.

FIG. 4 shows in a time series how the movable member 1 revolves. Also, FIG. 5 shows by an arrow a closed magnetic path through which magnetic flux due to the permanent magnet 2 runs in the actuator of this embodiment.

Although in this embodiment the conducting paths 3a and 3b are given on the two circuit boards stacked one on the other in such a configuration as to provide a phase difference of 90° between the currents flowing through these paths, the possible configuration is not limited to that and, as described later, may be of such a mode as having only one conducting path or even giving a plurality of sheets of conducting paths. Also, the configuration of the conducting paths themselves is not limited to this embodiment of providing circuit boards and, as described later, may be of such a mode as giving those conducting paths on a metal surface (face-shaped conductor) or giving three circuit boards stacked one on another so as to provide a phase degree of 120° between the current flowing directions. Also, although this embodiment has employed a permanent magnet as the magnetic field generator, any other means may be used such as an electric magnet or the like as far as it has a sufficient magnetomotive force.

Figure 6:
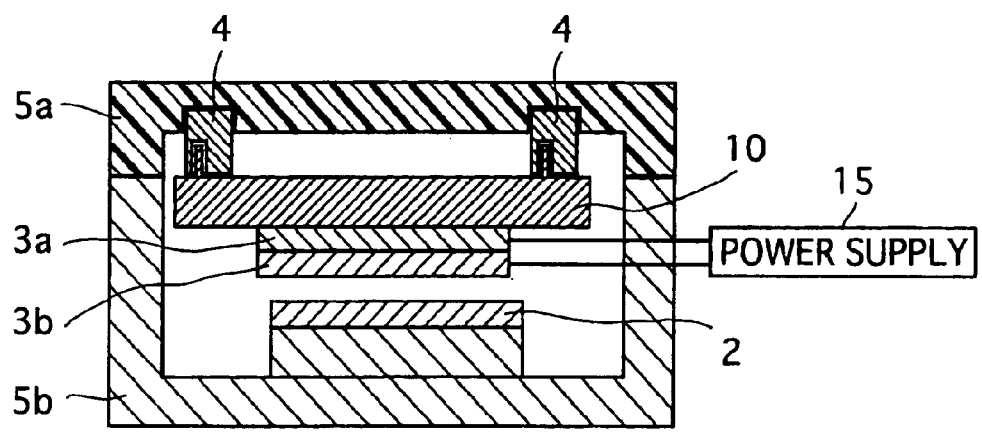
FIG. 6 is a cross-sectional view for showing a revolution type actuator according to a second embodiment of the invention.

FIG. 6 shows a revolution type actuator according to a second embodiment of the invention. In this embodiment, the movable member 1 is given as a movable iron core 10. The movable iron core 10 is appropriately made of a magnetic substance such as electromagnetic soft iron, electromagnetic steel or the like. Accordingly, the magnetic flux starting from the permanent magnet 2 passes through the conducting paths 3a and 3b, the movable iron core 10, and the stator iron core 5b to thereby suppress the leakage of the magnetic flux, thus improving the magnetism efficiency. Also, in this embodiment the stator 5a need not be made of a magnetic substance any longer and can be made of a resin, aluminum-based metal material or the like, thus reducing the weight and the costs of the relevant apparatus.

Figure 7:
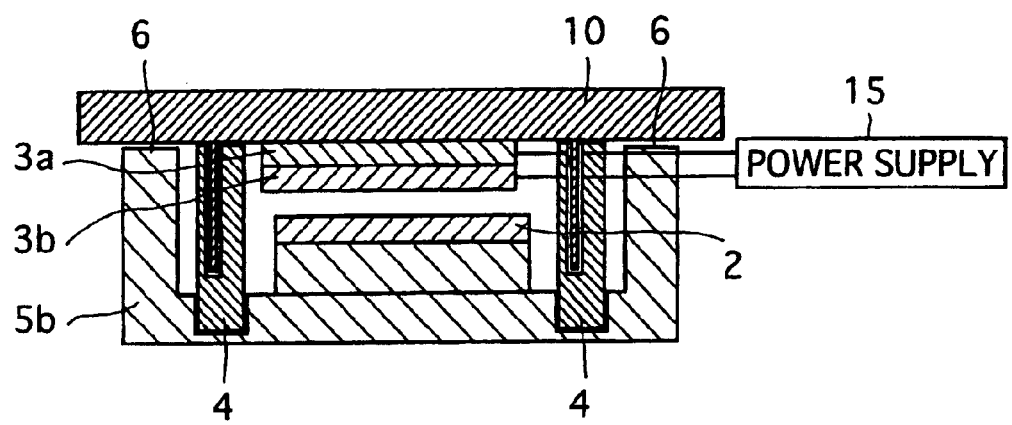
FIG. 7 is a cross-sectional view for showing a revolution type actuator according to a third embodiment of the invention.

FIG. 7 shows a revolution type actuator according to a third embodiment of the invention. In this embodiment, opposite the movable iron core 10 of the above-mentioned second embodiment, the stator iron core 5b has a magnetization face 6 which is always magnetized when it approaches in a direction perpendicular to the revolution trajectory face. When the movable iron core 10 revolves with the predetermined radius, the stator iron core 5b opposite the movable iron core 10 is always magnetized only in a direction perpendicular to the revolution trajectory face, so that the length of a gap between itself and the stator iron core 5b can be held roughly constant, thus reducing the leakage of the magnetic flux. Accordingly, the magnetism efficiency can be improved. Also, this effect can be maximized by sufficiently enlarging the outer diameter of the movable iron core 10 to always assure magnetization throughout on the magnetization face 6 at the upper end of the stator iron core 5b during the revolution motion. Further, as compared to the above-mentioned second embodiment, an attracting force opposite in direction to the revolution motion can be decreased between the movable iron core 10 and the stator iron core 5b, thus improving the energy efficiency.

Figure 8:
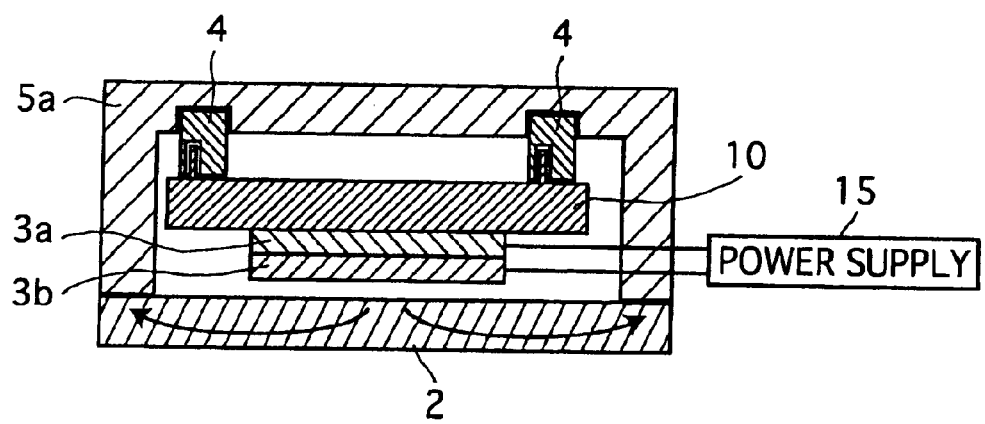
FIG. 8 is a cross-sectional view for showing a revolution type actuator according to a fourth embodiment of the invention.
Figure 9:
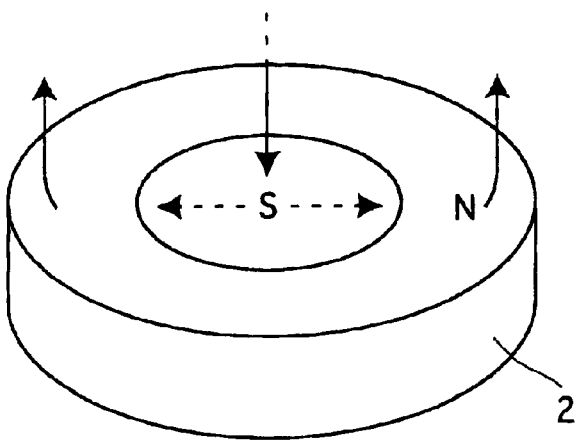
FIG. 9 is a perspective view for showing a configuration example of a permanent magnet of the revolution type actuator of the fourth embodiment.

FIG. 8 shows a revolution type actuator according to a fourth embodiment. FIG. 9 shows a configuration example of the permanent magnet 2 in this actuator. This embodiment is the same as the above-mentioned second embodiment except the method of magnetizing the permanent magnet 2. That is, in the permanent magnet 2 of this embodiment, the face opposite the movable iron core 10 is larger in area than the revolution trajectory region of the movable iron core 10 and also, on the inner and outer peripheries on the same face are provided an N-pole and an S-pole. The magnetic flux starts at one of those poles on this face and passes through, as indicated by an arrow in the figure, the interior of the permanent magnet 2 and terminates at the other pole on the same face, from which it then enters the stator 5a, thus forming a magnetic circuit. The permanent magnet 2 may be of such a configuration that the N- and S-poles are opposite in layout to FIG. 9. Also, the configuration of the poles is not limited to the above-mentioned one. By using such a magnetic circuit, even without the stator iron core 5b, the magnetic flux can be prevented from leaking to the outside of a face opposite to the face having therein both poles of the magnet 2. By doing so, this can thin the revolution type actuator.

Figure 10:
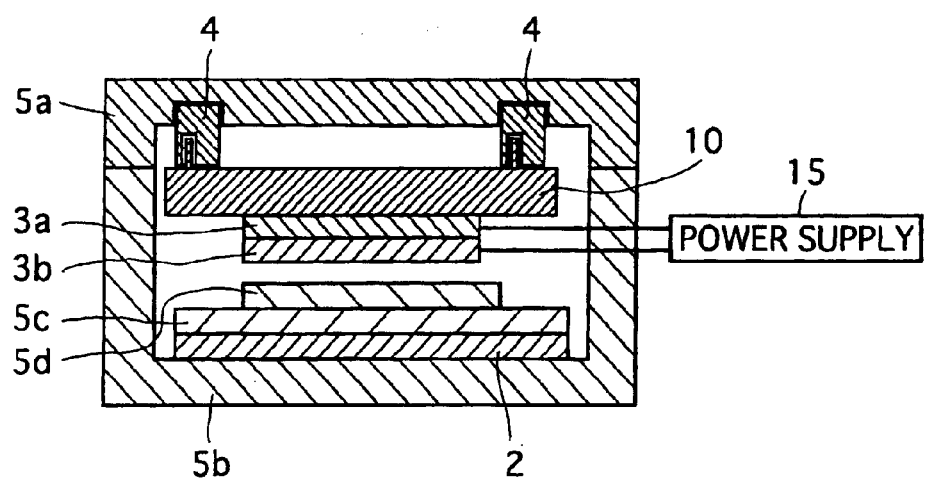
FIG. 10 is a cross-sectional view for showing a revolution type actuator according to a fifth embodiment of the invention.

FIG. 10 shows a revolution type actuator according to a fifth embodiment of the invention. This embodiment is the same as the above-mentioned second embodiment except that the pole face disposed opposite to the movable iron core 10 of the permanent magnet 2 is larger in area than the largest revolving region of the conductor paths 3. Besides, the permanent magnet 2 on the stator iron core 5b has stator iron cores 5c and 5d thereon stacked on its surface which are made of a magnetic substance such as electromagnetic soft iron. The first layer in the stack consists of the stator iron core 5c having the same cross sectional shape as the permanent magnet 2 and the second layer consists of the stator iron core 5d having a smaller area than the above-mentioned pole face and a larger upper face in area than the largest revolving region of the conductor path 3a or 3b, whichever larger. Accordingly, the magnetic flux starting from the permanent magnet 2 is concentrated as it passes through the stator iron cores 5c and 5d in this order, to largely enhance its density along the conducting path 3, thus improving torque. Although in FIG. 10 the magnetic substance is arranged in the pole face in such a step-like shape as consisting of the stator iron cores 5c and 5d, the shape is not limited to this embodiment. For example, those iron cores 5c and 5d may be integrated so that the upper face may be smaller in area than the pole face but larger than the largest revolving region of the conducting path 3a or 3b whichever larger and the lower face may be of frusto-conical shape with the same cross sectional area as the pole face, thus having the larger lower face and the smaller upper face with a tapered slope of the magnetic substance employed. Further, the upper and lower faces of the above-mentioned magnetic substance need not be the same or similar in shape and may be of any shape as far as it contributes to the solving of the above-mentioned problems.

Figure 11:
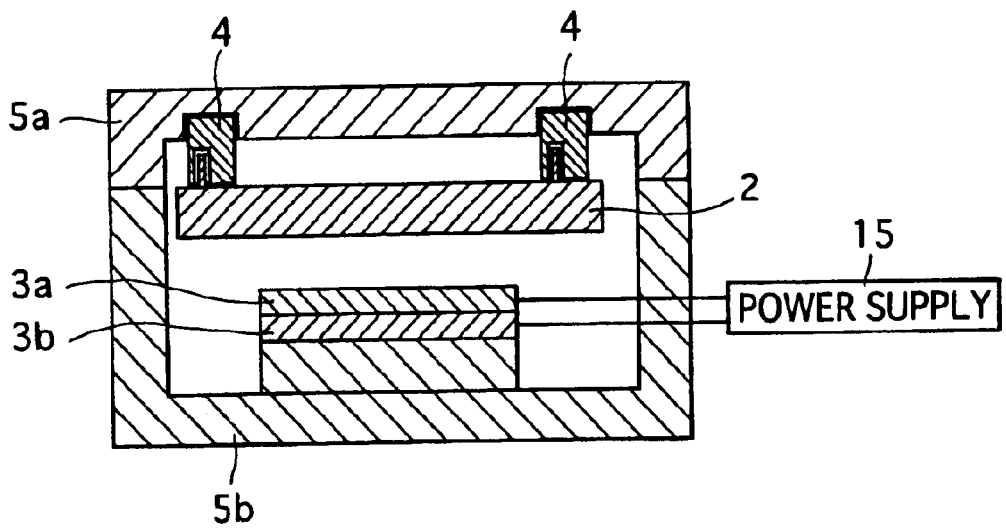
FIG. 11 is a cross-sectional view for showing a revolution type actuator according to a sixth embodiment of the invention.
Figure 12:
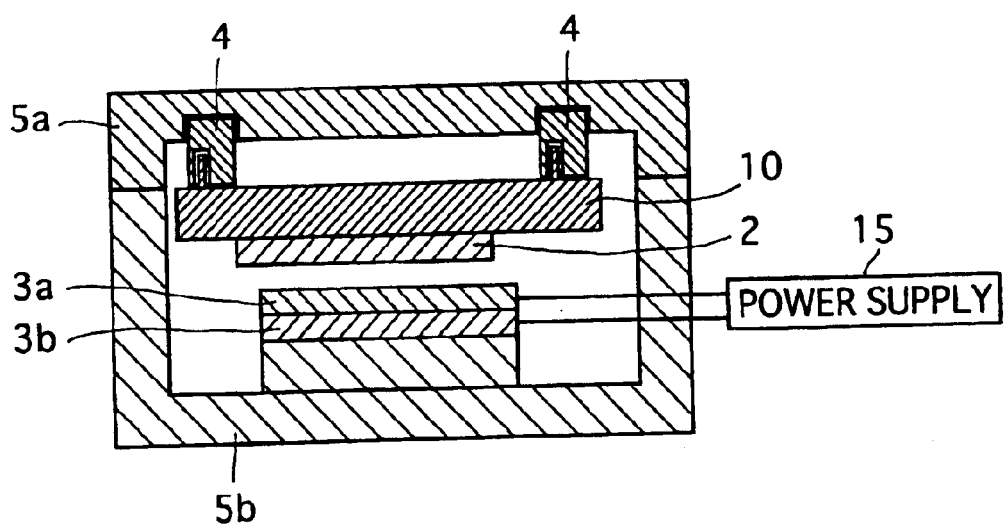
FIG. 12 is a cross-sectional view for showing a revolution type actuator according to a seventh embodiment of the invention.

FIG. 11 shows a revolution type actuator according to a sixth embodiment of the invention. FIG. 12 shows a revolution type actuator according to a seventh embodiment of the invention. In FIGS. 11 and 12, these inventions are the same as the above-mentioned first and second embodiments respectively except that the conducting paths 3a and 3b are fixed and the permanent magnet 2 is movable. In FIG. 11, the entire movable member is made of the permanent magnet 2, which revolves. In FIG. 12, the movable member is given as the movable iron core 10 made of a magnetic substance such as electromagnetic soft iron and the like, to which the permanent magnet 2 is attached in configuration. In both FIGS. 11 and 12, by attaching the conducting paths 3a and 3b to the stator iron core 5b, these paths 3a and 3b themselves do not revolve to thus simplify the connection for supplying power from the power supply to them and also avoid a problem of fatigue and the like of the wiring caused by revolving, thus prolonging the service life of the power supply wiring lines.

Figure 13A:
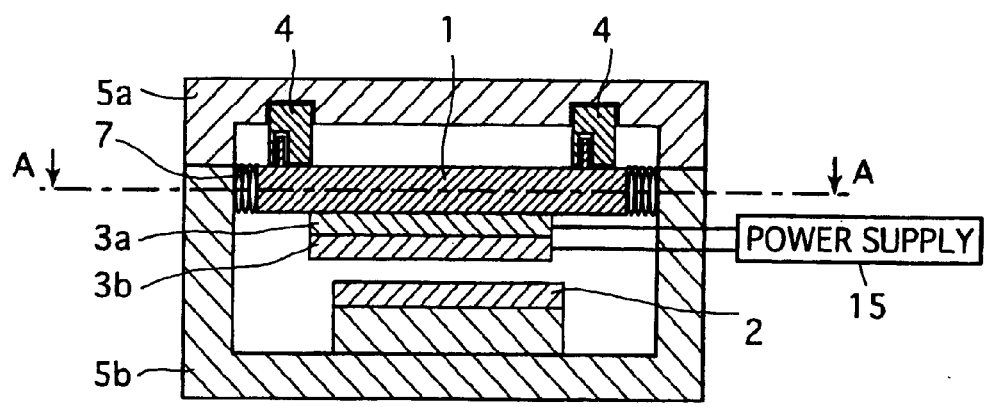
FIG. 13(a) is a cross-sectional view for showing a revolution type actuator according to an eighth embodiment of the invention.
Figure 13B:
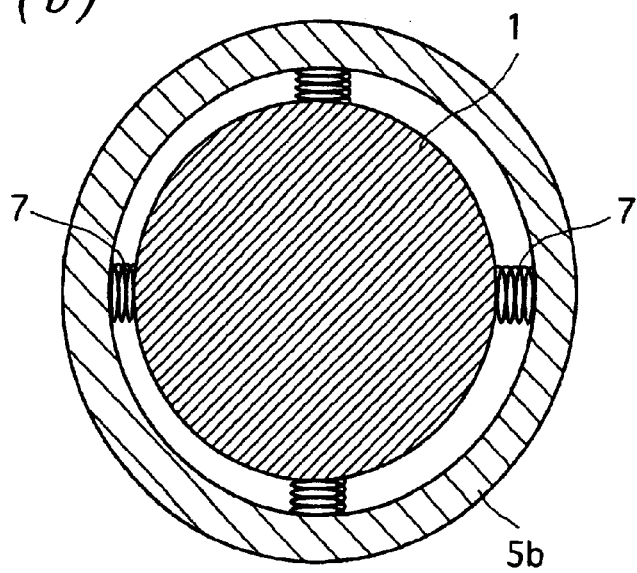
FIG. 13(b) is a cross-sectional view taken along line A—A of FIG. 13(a)

FIGS. 13(a) and 13(b) indicate a revolution type actuator according to an eighth embodiment of the invention. This embodiment is the same as the above-mentioned first embodiment except that between the movable member 1 and the stator iron core 5b is interposed a plurality of compression springs 7 that can be compressed in the revolving plane of the movable member 1 and that has such a spring coefficient as to enable mutual resonance at a predetermined vibration frequency. That is, this embodiment uses the resonance of the springs to thereby effectively utilize the output energy of the revolution type actuator.

Figure 14A:
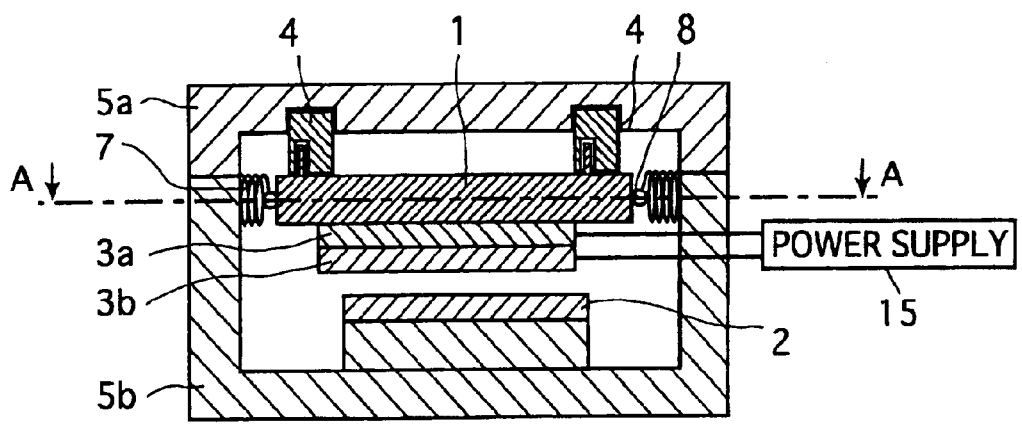
FIG. 14(a) is a cross-sectional view for showing a revolution type actuator according to a ninth embodiment of the invention.
Figure 14B:
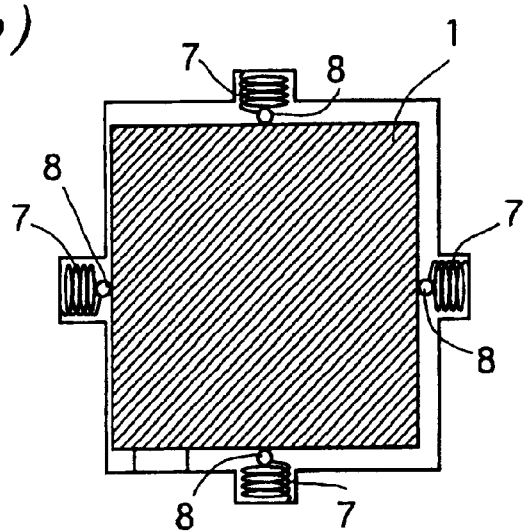
FIG. 14(b) is a cross-sectional view taken along line A—A of FIG. 13(a)

FIGS. 14(a) and 14(b) show a revolution type actuator according to a ninth embodiment of the invention. This embodiment is the same as the above-mentioned eighth embodiment except that a bearing 8 is interposed between the movable member 1 and the compression spring 7 in configuration. That is, by the eighth embodiment of directly attaching the compression springs 7 to the movable member 1, a lateral force is applied to the compression springs 7 to accelerate their deterioration due to fatigue and the like, to guard against which this embodiment transmits a force to the movable member 1 via the bearing 8 at the tip of each of the compression springs 7 as shown in FIGS. 14A and 14B in configuration to thereby suppress their deterioration due to fatigue and the like, thus prolonging the service life of the revolution type actuator. Also, although the above-mentioned first through eighth embodiments have employed the circular shaped movable member 1 or movable iron core 10, stators 5a and 5b, conducting paths 3a and 3b and the like, the shape may be a rectangle for the movable member 1, the stators 5a and 5b and the like. Such a shape can also enable a revolution motion of the movable member.

Figure 15:
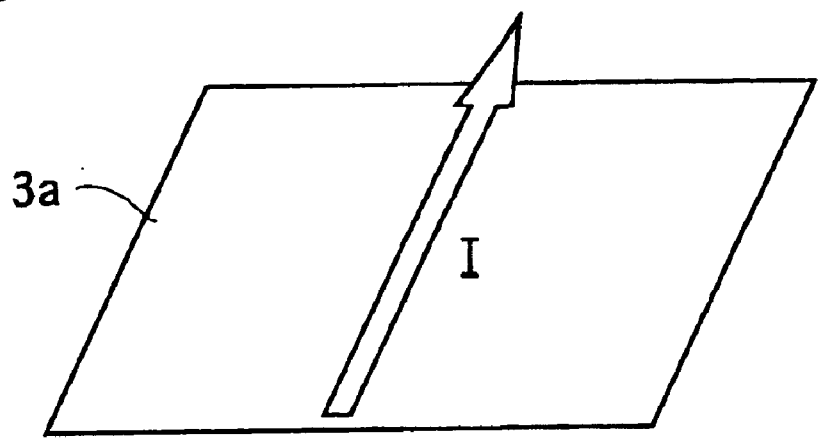
FIG. 15 is perspective view for showing a configuration example of a conducting path of a revolution type actuator according to a tenth embodiment of the invention.
Figure 15:
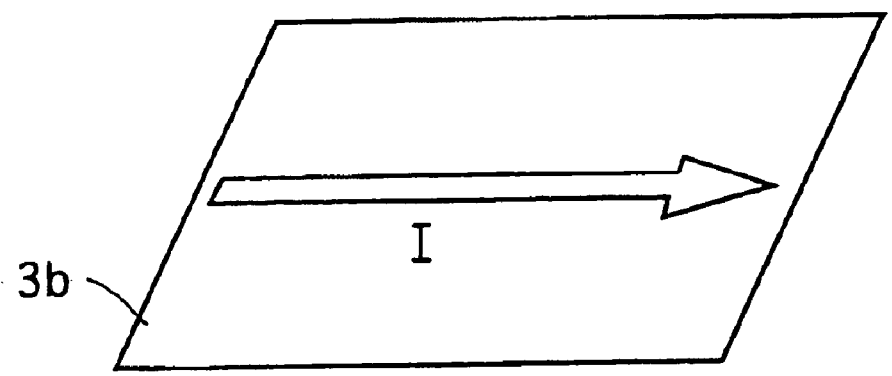

FIG. 15 shows a different configuration the conducting paths 3 in an actuator of the invention. In this embodiment, the conducting paths 3a and 3b are made of copper foil, with the driving principle being the same as that of the first embodiment. In contract to the first embodiment, however, the conducting paths 3a and 3b are sheet shaped to thereby flow the current I throughout on the face of the copper foil and the conducting portion can be enlarged in cross-sectional area to thereby reduce an energy loss due to the generation of the Joule's heat, thus improving the energy efficiency as a whole. Although this embodiment has formed the conducting paths 3a and 3b of copper foil, any other appropriate metal may be used instead. For example, gold (Au), silver (Ag), iron (Fe), aluminum (Al), or any other substance having the metal properties may be used as far as it contributes to the solving of the above-mentioned problems.

Figure 16A:
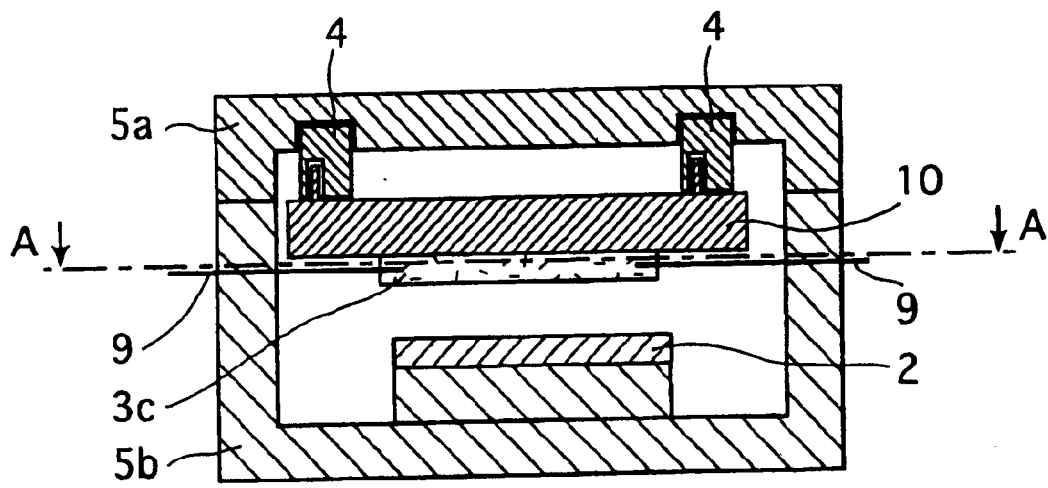
FIG. 16(a) is a cross-sectional view for showing a configuration example of a conducting path of a revolution type actuator of an eleventh embodiment of the invention.
Figure 16B:
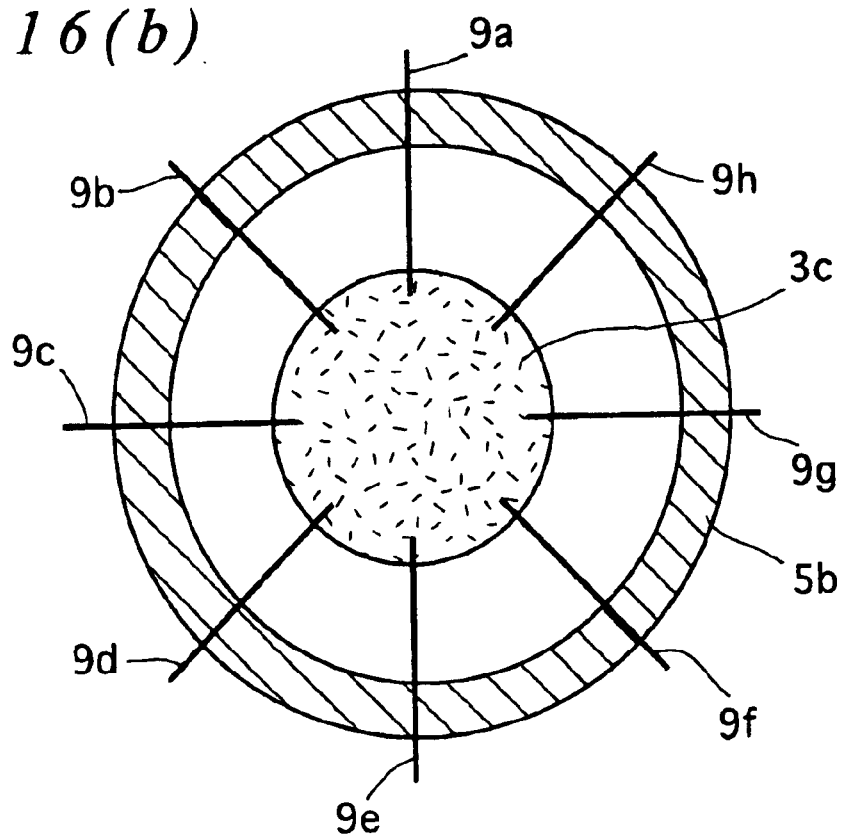
FIG. 16(b) is a cross-sectional view taken along line A—A of FIG. 16(a)
Figure 17A:
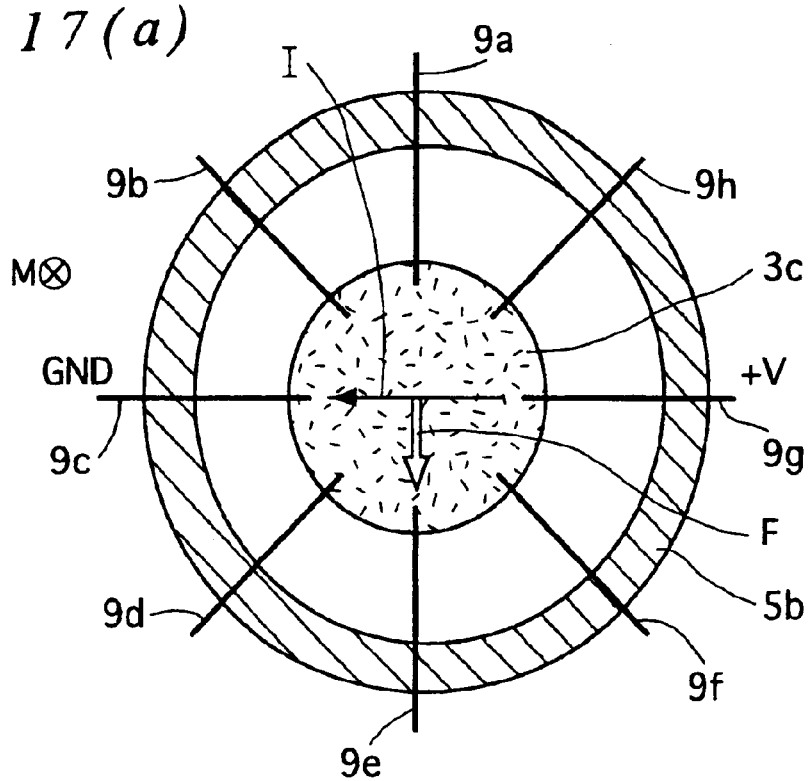
FIG. 17(a) is a cross-sectional view for showing a direction in which an electromagnetic force is generated when a current is conducted between 9g and 9c in a configuration example of a conducting path shown in FIG. 16(b)
Figure 17B:
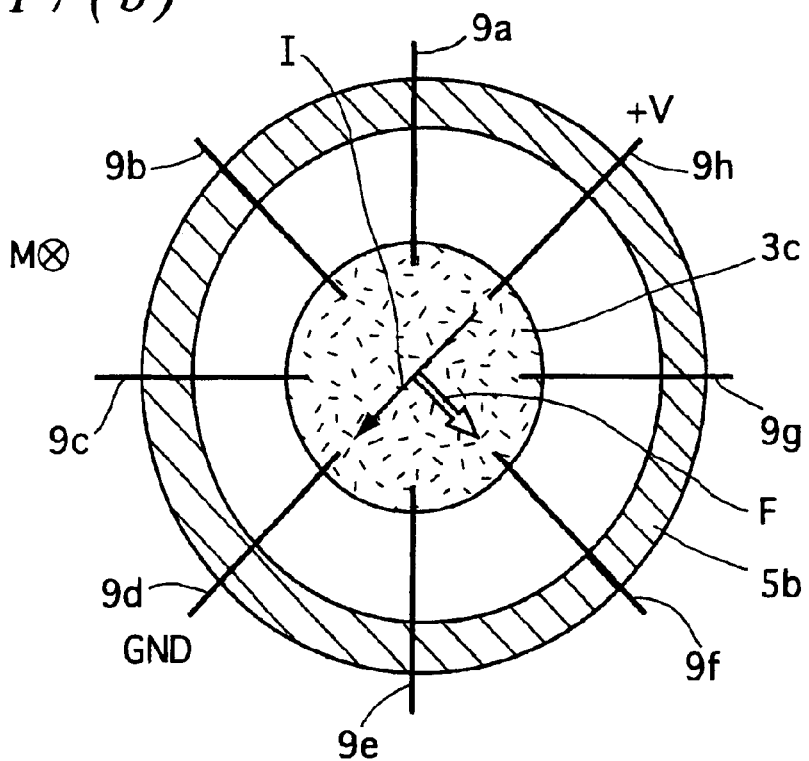
FIG. 17(b) is a cross-sectional view for showing a state where a current is conducted between 9h and 9d.

FIGS. 16(*a*) and 16(*b*) indicate another different configuration example of the conducting paths in a revolution type actuator of the invention. In this embodiment, one sheet of a copper sheet 3c (face-shaped conductor) is used in configuration as the face-shaped metallic substance which the above-mentioned conducting paths 3 are made of, through which currents flow so that lead wires 9a through 9h (electrodes) may run in a radial manner from the copper sheet 3c as shown in the figure. Also, magnetic flux M occurring from the permanent magnet 2 penetrates the copper sheet perpendicularly, thus forming a magnetic circuit. As for the direction in which an electromagnetic force is generated in this configuration of the conducting paths, FIG. 17(*a*) shows a case where a current is conducted between 9g and 9c and FIG. 17(*b*), a case where it is conducted between 9h and 9d. If the copper sheet 3c is biased leftward as shown in FIG. 17(*a*), the lead wires 9c and 9g are placed under application of GND level (0 V) and a positive voltage (+V) respectively to thereby flow the current in an arrow direction, thus generating the force F toward the viewer of the figure. If then the copper sheet 3c comes near a position indicated in FIG. 17(*b*), the lead wires 9d and 9h are placed under application of GND (0 V) and a positive voltage (+V) respectively, thus generating the force F obliquely rightward toward the viewer of the figure. By thus changing the lead wire to which the voltage is applied, the force can be generated so as to revolve the movable member 1.

Figure 19:
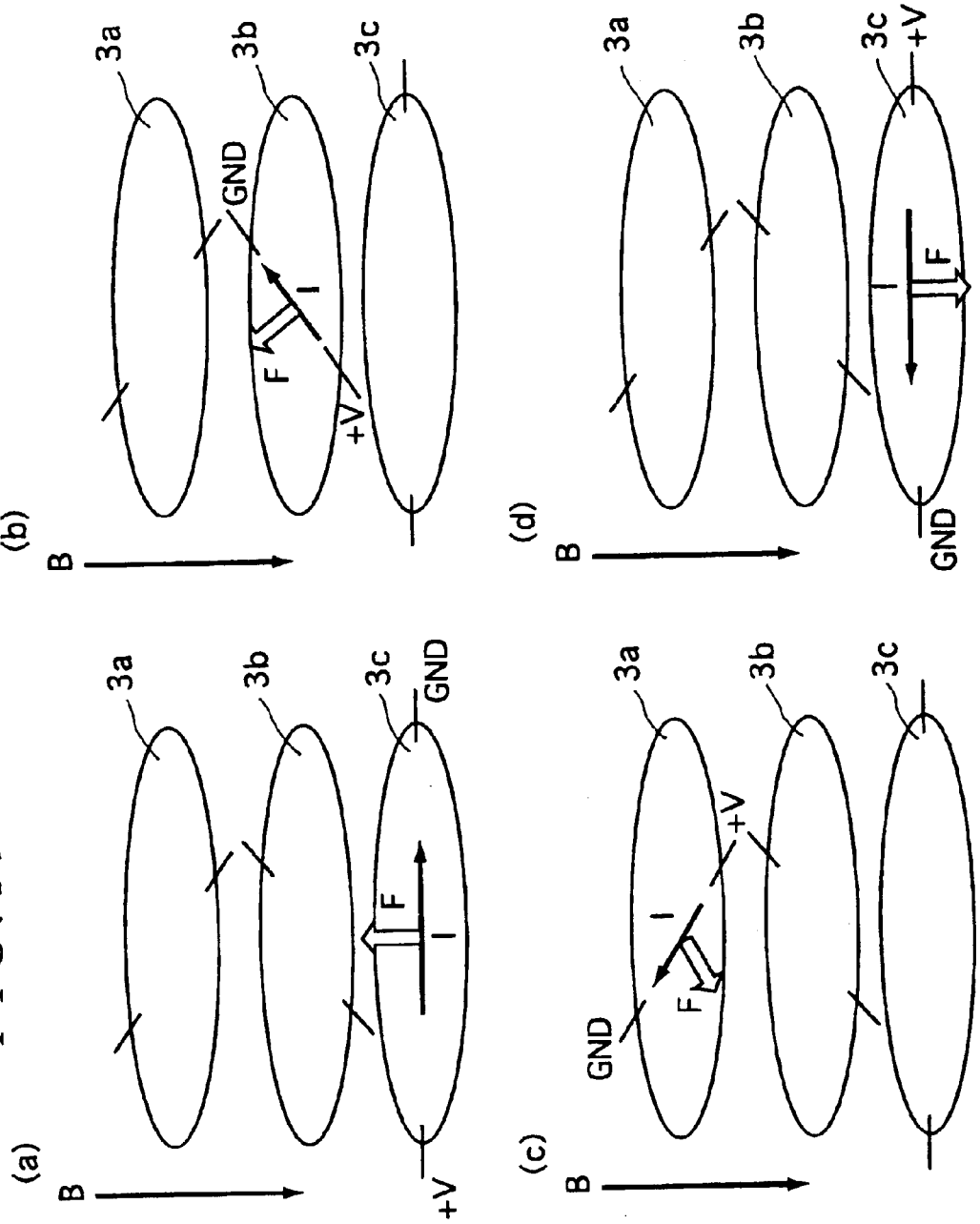
FIGS. 19(a), 19(b), 19(c), and 19(d) are illustrations for showing time-sequential operations of a conducting path.

FIGS. 18(*a*) and 18(*b*) show a configuration of a revolving type actuator according to a twelfth embodiment of the invention and its conducting paths. FIGS. 19(*a*), 19(*b*), 19(*c*), and 19(*d*) show time series-wise operations of the conducting paths. In this embodiment, the conducting paths 3a, 3b, and 3c attached to the movable member 1 are stacked one on another with insulation maintained therebetween in such a configuration as comprised of a plurality of sheets of face-shaped conductors provided with the lead wires 9 (electrodes) for flowing currents in different directions. By changing the current flowing electrode sequentially, a current flowing through each of the conducting paths can be controlled, so that the directional electromagnetic force F generated by the interaction between this current I and the magnetic field B of the magnet 2 may provide a circular motion time-wise.

Figure 20:
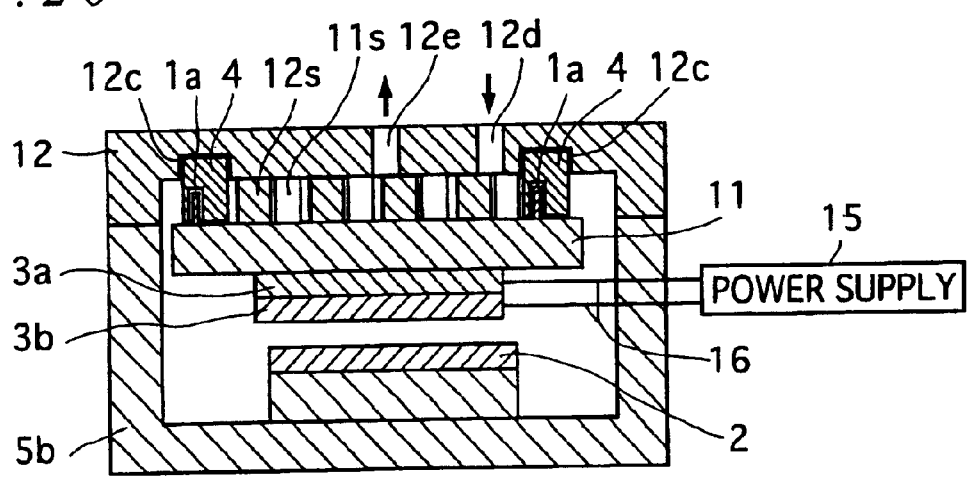
FIG. 20 is a cross-sectional view for showing a configuration in a case where the revolution type actuator according to the eleventh embodiment of the invention is used as a source for driving a scroll pump.
Figure 21:
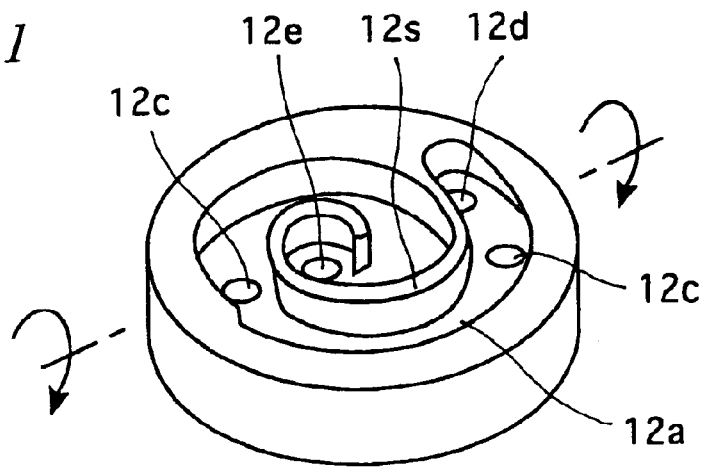
FIG. 21 is an exploded perspective view for showing a scrolling portion of the above-mentioned embodiment.
Figure 21:
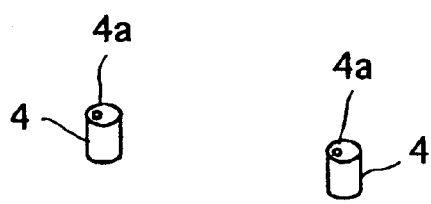
Figure 21:
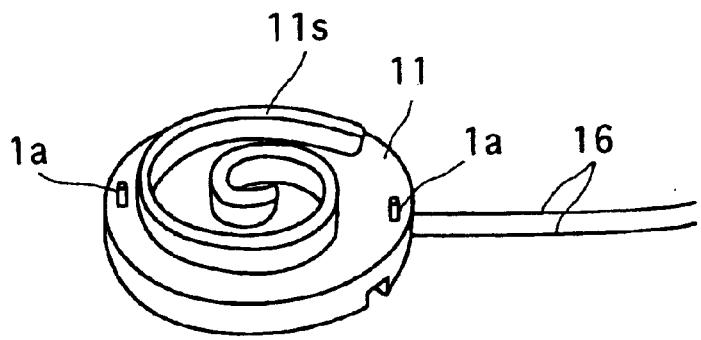
Figure 21:
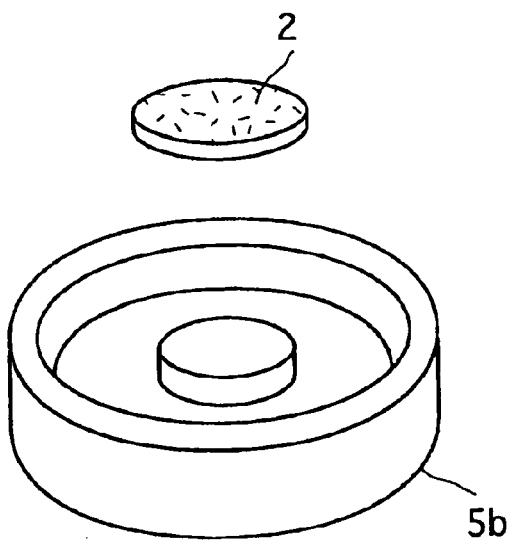
Figure 22:
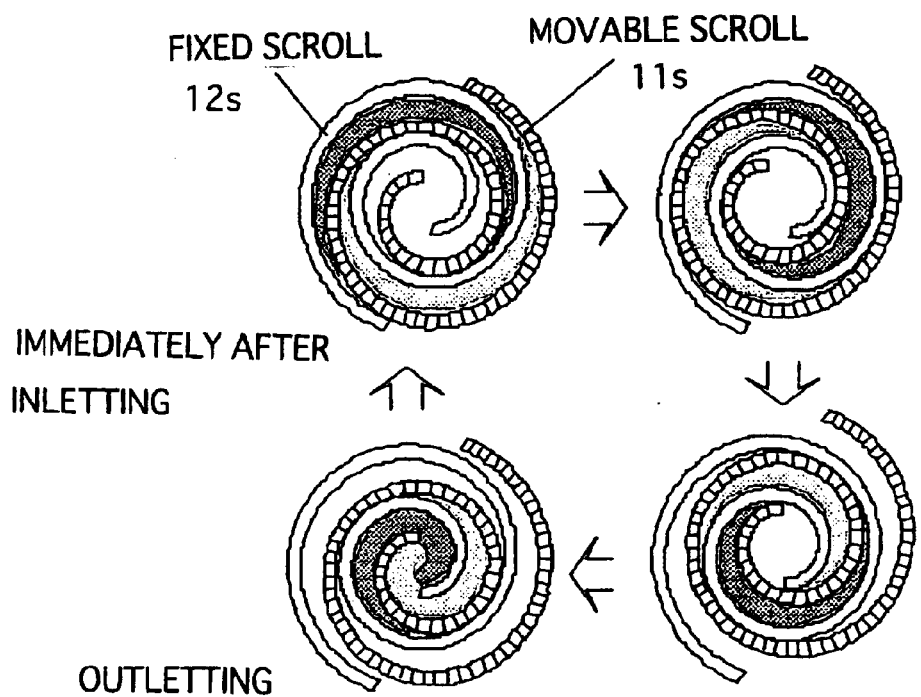
FIG. 22 is an illustration for explaining operations of the above-mentioned scrolling portion.

FIG. 20 shows an embodiment in which a revolution type actuator of the invention is used as a source for driving a scroll pump. FIG. 21 shows a scrolling portion of this embodiment. FIG. 22 shows pumping operations by the scrolling portion. As shown in those figures, the movable element is given as a movable scroll 11 and the fixed member is given as a fixed scroll 12 in such a configuration that the movable scroll 11 is held on the fixed scroll 12 in a revolution manner via the eccentric shaft 4. Spiral blades 11s provided to the movable scroll 11 and spiral blades 12s provided to the fixed scroll 12 are combined with each other to thereby form the scroll pump. By revolving the movable scroll 11 around the eccentric shaft 4 with the predetermined radius, an enclosed space formed by the spiral blades of those two scrolls can be shifted from the outside toward the center side, thus consecutively reducing the volume of that enclosed space. On the fixed scroll 12 a spiral groove 12a has an inlet 12d formed in the outer periphery and an outlet 12e in the center. In a hole 12c is held the eccentric shaft 4 in a rotary manner.

Thus, when the actuator of the invention is used as a source for driving a scroll pump, the movable scroll 11 can be directly driven in configuration as the movable member of the actuator. Accordingly, an extra transmission mechanism or motor as a driving source need not be mounted below the scroll pump, thus thinning the pump as a whole. The revolving movable scroll 11 may be entirely or partially made of a rare earth-based or ferrite-based permanent magnet or a plastic magnet having a magnetomotive force or such a magnetic substance as an electromagnetic steel sheet or soft iron.

Figure 23:
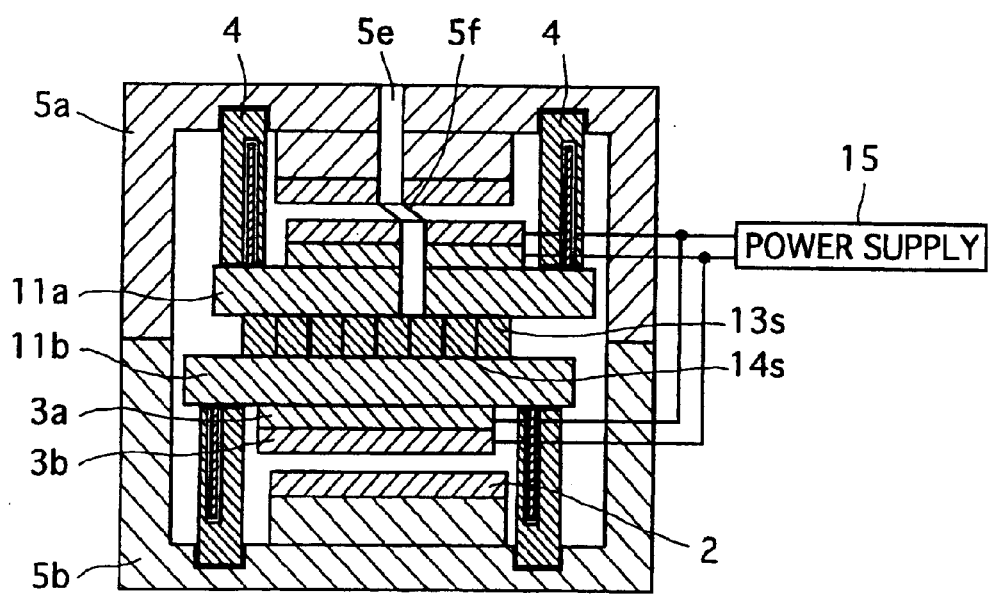
FIG. 23 is a cross-sectional view for showing a configuration in a case where the revolution type actuator according to the twelfth embodiment of the invention is used as a source for driving a scroll pump.

FIG. 23 shows an embodiment in which two of a revolution type actuator of the invention is used vertically as a source for driving a scroll pump. Such a configuration makes it possible to drive the movable scrolls 11a and 11b at the same time. Further, by delaying in operation the movable scroll 11b half a period than the movable scroll 11a, a center-to-center relative distance between them can always be a double the revolving radius of the movable scroll. This conversely means that air can be compressed only by revolving the movable scrolls 11a and 11b with a revolving radius which is half that of the movable scroll conventionally necessary for compressing the air. Also, the vibrations of the movable scrolls 11a and 11b caused by a shift in gravity center offset each other. Accordingly, the vibration and noise can be reduced. In this embodiment, the movable scrolls 11a and 11b are provided with the spiral blades 13s and 14s which are combined with each other. The stator 5a has the air outlet 5e, in communication with which is provided an air outlet pipe 5f penetrating the movable scroll 11a etc. The inlet etc. are omitted in illustration.

The revolution type actuator of the invention is not limited to the above-mentioned embodiments and various modifications may be made therein as far as they do not depart from the score or spirit of the invention.

What is claimed is:

1. A revolution type actuator having a movable member performing a revolution motion, comprising:
   a movable member that can revolve with respect to a fixed member;
   a plurality of conducting paths which are on a face parallel to a trajectory face of said revolution motion and by which AC currents flow in intersecting directions with a mutual phase difference in accordance with an angle at which the conducting paths intersect each other;
   a power supply which flows currents with a phase difference in said plurality of conducting paths; and
   a magnetic field generator which forms a magnetic field perpendicular to said conducting paths;
   wherein said movable member revolves due to an electromagnetic force generated by an interaction between a current flowing in said conducting paths, and a magnetic field generated by said magnetic field generator.

2. The revolution type actuator according to claim 1, wherein the plurality of conducting paths is equal to two, which intersect with each other at an angle of about 90°; and
   currents flowing through said two conducting paths have a phase difference of about 90° therebetween.

3. The revolution type actuator according to claim 1, wherein one of the plurality of conducting paths is formed on a printed circuit board.

4. The revolution type actuator according to claim 1, wherein the magnetic field generator includes a magnet, and an outer case made of a magnetic substance for forming an enclosed magnetic path in which magnetic flux occurring from said magnet passes.

5. The revolution type actuator according to claim 1, further comprising a rotation constraining mechanism for holding the movable member on the fixed member in a rotary manner via an eccentric shaft to thereby constrain said movable member from rotating.

6. The revolution type actuator according to claim 1, wherein:
   the magnetic field generator includes a magnet and a stator, which is magnetized by magnetic flux generated by said magnet; and
   the movable member is provided with a conductor which is arranged opposite a magnetic pole of said magnet, in a plane perpendicular to the magnetic flux generated between said magnet and said stator, to thereby form one of the plurality of conducting paths, the moveable member thus revolving due to an electromagnetic force generated by an interaction between a current flowing through said conductor and a magnetic field formed by said magnetic flux.

7. The revolution type actuator according to claim 6, wherein the movable member is entirety or partially made of a magnetic substance.

8. The revolution type actuator according to claim 7, wherein the stator approaches steadily facing to a magnetic substance of the movable member, and has a magnetized face winch is perpendicular to said revolving trajectory face.

9. The revolution type actuator according to claim 6, wherein the magnet has N- and S-poles on inner and outer peripheries respectively, which are on one face opposite the movable member, to thereby form a magnetic circuit in which magnetic flux starting from one of said poles enters the stator, thus preventing magnetic flux from leaking to an external space from a face opposite to the face having both of said poles of said magnet.

10. The revolution type actuator according to claim 6, wherein a magnetic substance is arranged on a pole face of the magnet opposite the movable member and the conductor, and
   said magnetic substance has a face thereof opposite said conductor, formed larger in area than a largest revolving region of said conductor and smaller than the pole face, and a face thereof opposite the magnet formed almost as large as said pole face.

11. The revolution type actuator according to claim 1, wherein:
   the movable member is entirely or partially made of a magnet;
   the magnetic field generator includes said magnet and a stator which is magnetized by magnetic flux generated by said magnet;
   one of the pluralities of conducting paths is arranged on a side of the stator opposite a pole of said magnet of said movable member; and
   said movable member is arranged in a plane perpendicular to magnetic flux running between said magnet and said stator, thus revolving due to an electromagnetic force generated by an interaction between a current flowing in the one of the pluralities of conducting paths and a magnetic field generated by said magnetic flux.

12. The revolution type actuator according to claim 6, wherein a spring is interposed between the movable member and the stator.

13. The revolution type actuator according to claim 12, wherein the spring is provided with a bearing at a tip thereof on the side of the movable member.

14. The revolution type actuator according to claim 1, wherein the plurality of conducting paths are made of a face-shaped conductor.

15. The revolution type actuator according to claim 14, wherein the face-shaped conductor is provided with a plurality of electrodes; and
   the direction of a current flowing through said face-shaped conductor is controlled by sequentially changing said current flowing electrodes.

16. The revolution type actuator according to claim 1, wherein the plurality of conducting paths are comprised of a plurality of sheets of face-shaped conductors which are stacked one on another with insulation maintained therebetween and which are provided with electrodes so as to flow current in different directions; and
   wherein said current flowing electrodes can be sequentially changed to thereby control a current flowing through each of said conducting paths, so that the directional electromagnetic force generated by an interaction between said current and said magnetic field may provide a circular motion time-wise.

17. The revolution type actuator according to claim 1, wherein:
   the actuator has a configuration of a scroll pump, the movable member is held on said fixed member in a revolutionary manner via an eccentric shaft, andsaid actuator further comprises:
   a movable scroll having spiral blades provided to said movable member;
   a fixed scroll having spiral blades provided to said fixed member;
   said spiral blades of said movable and fixed scrolls combined with each other; and
   wherein said movable scroll is revolved around said eccentric shaft with a predetermined radius to thereby shift an enclosed space formed by said spiral blades of both of said scrolls from the outside toward the center, thus consecutively reducing the volume of said enclosed space.

18. The revolution type actuator according to claim 1, wherein:

the actuator has a configuration of a scroll pump, the movable member is a first moveable member;

the actuator further comprises a second moveable member the first and second movable members each held to said fixed member in a revolutionary manner via an eccentric shaft;

said first and second movable members are each provided with a movable scroll having spiral blades;

said spiral blades of said movable scrolls are combined with each other; and said movable scrolls are revolved mutually oppositely with a predetermined radius around said eccentric shaft to thereby shift enclosed space formed by said spiral blades of said movable scrolls from the outside toward the center, thus consecutively reducing the volume of said enclosed space.

19. A revolution type actuator, comprising:

a conducting member having a plurality of conducting paths by which currents flow in mutually intersecting directions;

a power supply which flows currents with a phase difference in the plurality of conducting paths; and a magnetic field generator which forms a magnetic field perpendicular to a conducting face formed by said conducting paths, wherein either one of the conducting member or the magnetic field generator revolves due to an electromagnetic force generated by an interaction between a current flowing in the conducting path and a magnetic field generated by the magnetic field generator.

20. A revolution type actuator having a movable member performing a revolution motion, comprising:

a movable member that can move with a revolution motion with respect to a fixed member;

a plurality of conducting paths which are on a face parallel to a trajectory face of said revolution motion and by which AC currents flow in intersecting directions with a mutually phase difference in accordance with an angle at which the conducting paths intersect each other;

a power supply which flows currents with a phase difference in said plurality of conducting paths; and a magnetic field generator which forms a magnetic field perpendicular to said conducting paths;

wherein said movable member moves with a revolution motion due to an electromagnetic force generated by an interaction between a current flowing in said conducting paths, and a magnetic field generated by said magnetic field generator.

* * * * *

UNITED STATES PATENT AND TRADEMARK OFFICE
CERTIFICATE OF CORRECTION

PATENT NO. : 6,710,483 B2
DATED : March 23, 2004
INVENTOR(S) : Tomohiro Ota et al.

It is certified that error appears in the above-identified patent and that said Letters Patent is hereby corrected as shown below:

Title page,
Item [56], References Cited, FOREIGN PATENT DOCUMENTS, "59-93443" should read as -- 58-93443 --.

Column 9,
Line 54, "entirety" should read as -- entirely --.
Line 59, "winch" should read as -- which --.

Signed and Sealed this

Thirtieth Day of November, 2004

JON W. DUDAS
*Director of the United States Patent and Trademark Office*